Patented Nov. 22, 1927.

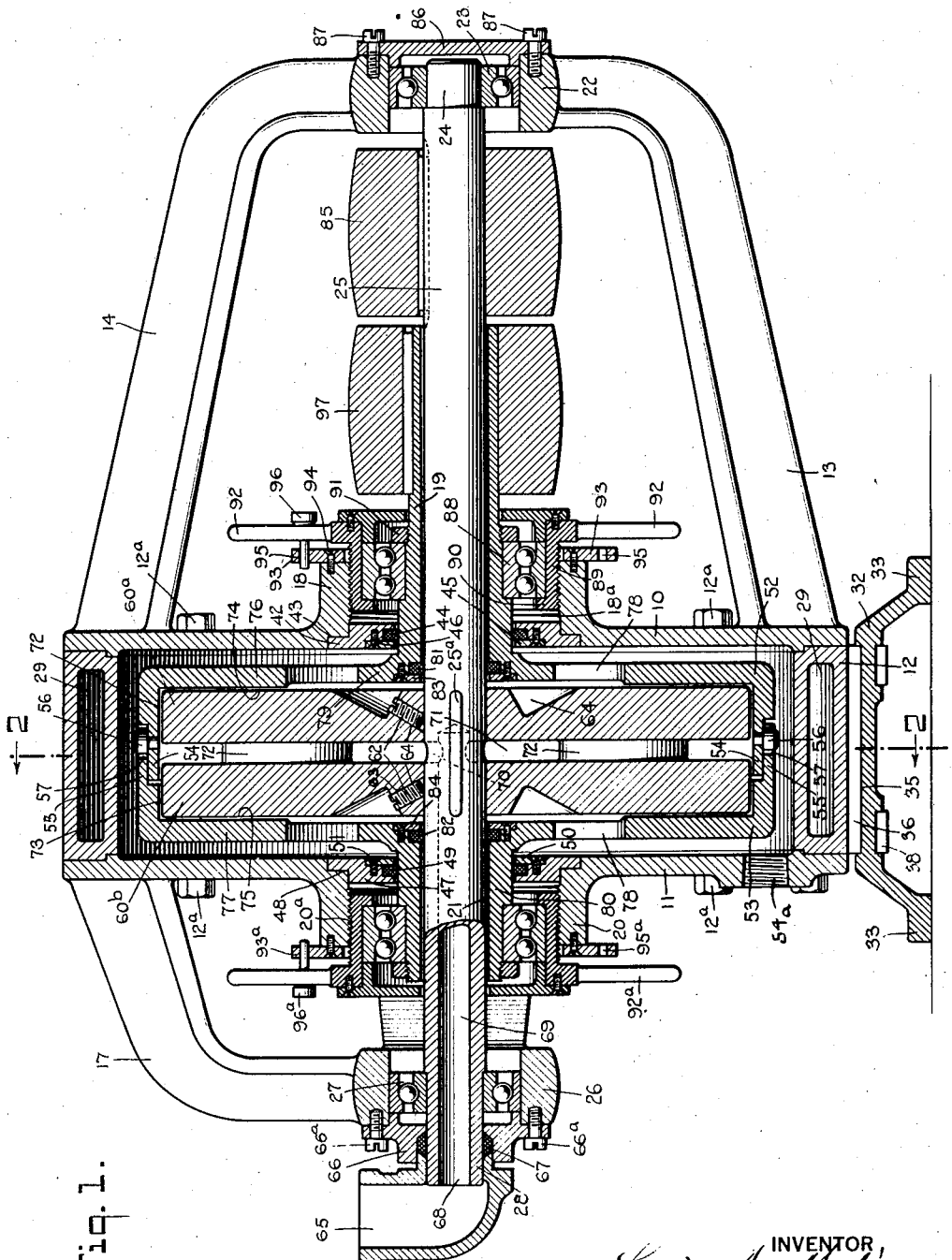

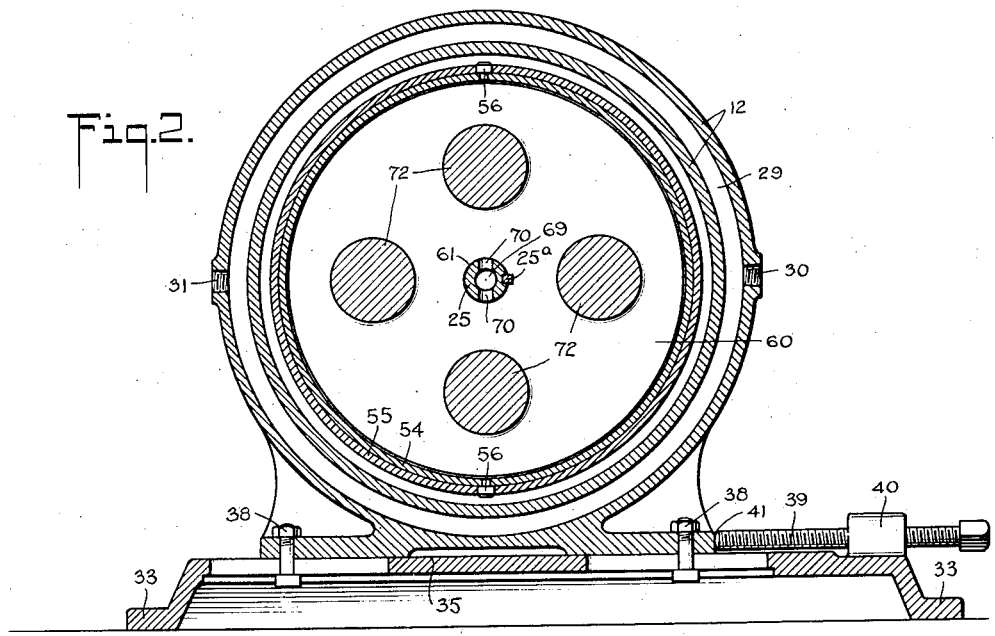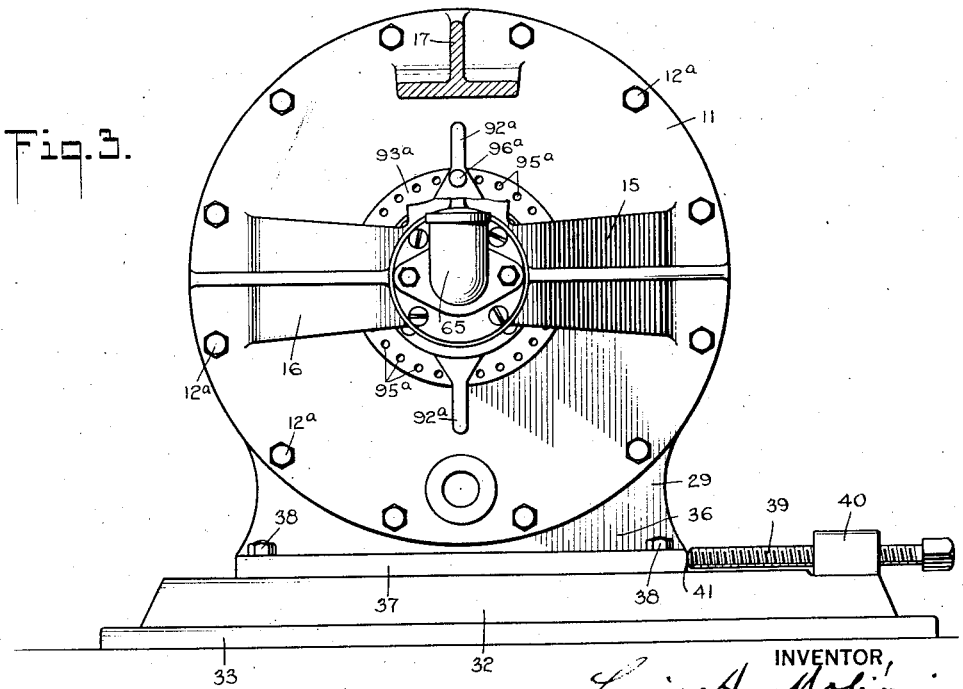

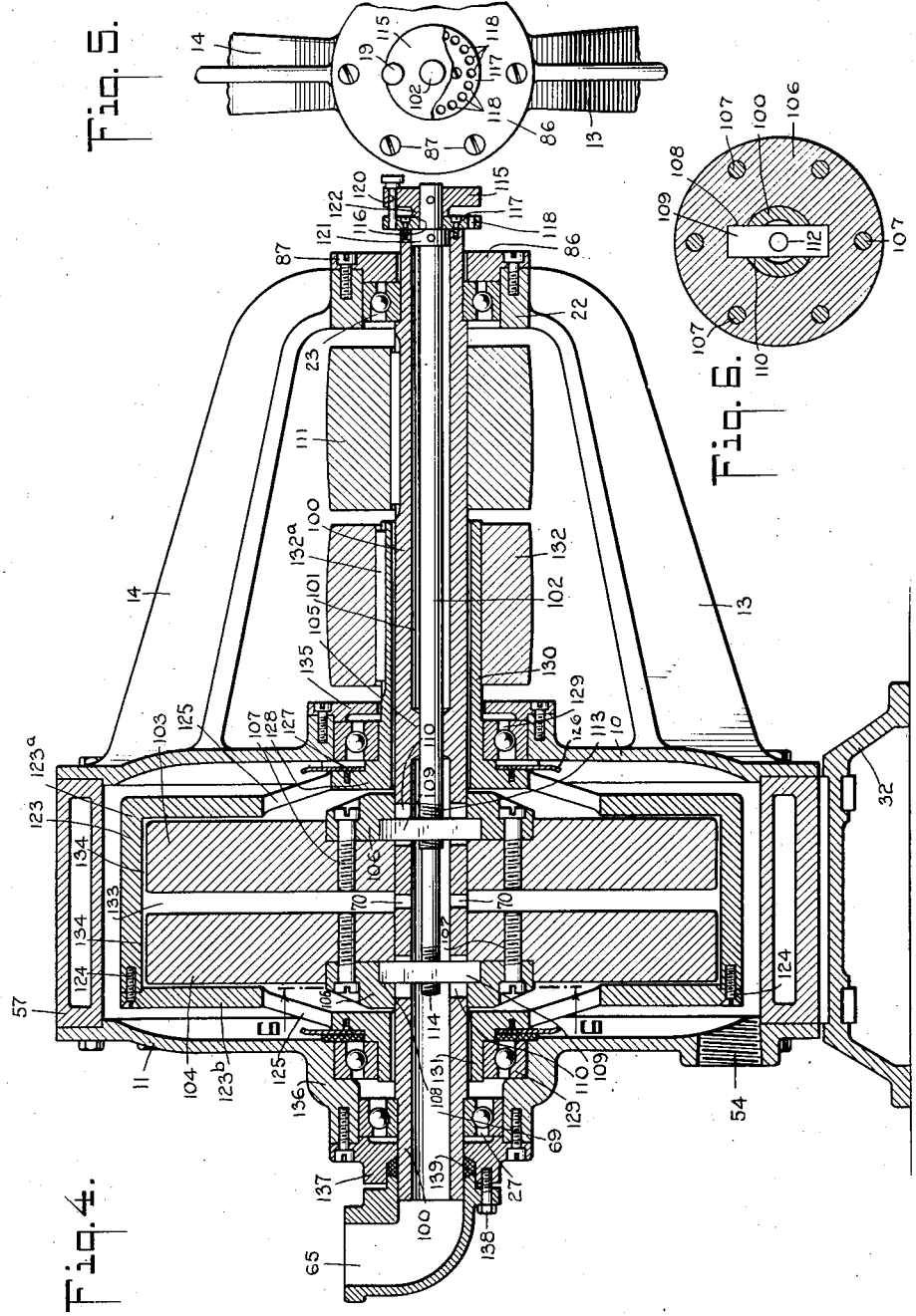

1,650,088

UNITED STATES PATENT OFFICE.

LOUIS A. MOLIN, OF NEW YORK, N. Y.

COLLOID MILL.

Application filed December 17, 1925. Serial No. 76,067.

This invention relates to the improved colloid mills and an improved method of homogenizing emulsions.

An object of the invention is to provide an improved means for homogenizing the emulsification of two or more immiscible ingredients at least one of which is a fluid, by subjecting the ingredients to a stage of general emulsification and thereafter to a stage of controlled time period and controlled intensity of shearing and resulting coefficient of dispersion of the respective ingredients in the resultant homogenized emulsion. As one means for carrying out my method, the mixture to be homogenized is led to such initial stage of emulsification of a fixed clearance of a magnitude selected in accordance with the ingredients of the mixture, whereafter the partially emulsified mixture is led to a succeeding or final emulsifying stage the magnitude of the clearance of which and the time period of treatment at such emulsifying stage is regulated as desired.

One form of my colloid mill comprises a rotor of cylindrical form, the circular or peripheral surface of which combined with the surface of a suitably associated member to constitute the initial emulsifying stage and a flat face of the cylindrical rotor combines with a suitably associated flange member of regulatable effective extent for determining the time period of treatment and adjustable means for mounting the cylindrical rotor to regulate the clearance and shearing effect of the subsequent treatment stage.

Preferably, such cylindrical rotor is associated with an outer rotor and the two rotors are rotated in opposite directions, thereby increasing the relative shearing forces at both or all the emulsifying stages.

In the most preferred form of carrying out my invention, and also exemplifying the most preferred form of my machine, such machine comprises a liquid-tight casing having oppositely disposed central flanges for receiving suitable bearings, a hollow or outer rotor element disposed within the cylindrical casing and mounted on and driven by a hollow shaft supported by bearings enclosed within said oppositely disposed central flanges, a pulley for rotating such hollow shaft, a second or inner rotor element disposed within said hollow rotor element and mounted on and driven by a shaft supported by suitable bearings and disposed within said first-named hollow shaft, a pulley carried by said second-named shaft for rotating said inner rotor and preferably in the opposite direction, said second-named shaft being hollow for a part of its length extending from one of its ends, suitable means serving as an inlet for the ingredients to be homogenized, an intermediate portion of said second-named hollow shaft being provided with passages communicating with suitable passages through said inner rotor, to afford a path radially of and within said inner rotor for the liquids to be homogenized. The emulsifying of the ingredients in film form is effected at two stages, one stage ensuing between the cylindrical face of the hollow or outer rotor and the second stage ensuing between the flat, oppositely disposed circular surfaces of said inner rotor and the inner flat surfaces of the flanges of the outer rotor. Suitable openings are provided within the flanges of said outer rotor for the discharge of the homogenized mixture into the casing from which it is discharged as desired.

Pursuant to my method, the effective flange length of the hollow or outer rotor member is selected to thereby determine the time interval of treatment of the mixture at the subsequent or final stage and thereby regulate the period of treatment of the mixture at the initial stage and accordingly of the total period of the emulsifying treatment of the mixture.

The outer diameter of the inner rotor member and the inner diameter of the outer rotor member are selected to provide the desired magnitude of clearance between the respective rotor members when moving in opposite directions at the initial stage. The hollow or outer rotor member is preferably formed of mutually telescoping parts, respectively integral with or secured to oppositely extending shaft ends and provided with suitable clearance regulating means for adjusting the respective clearances between the flat faces of the inner rotor member and the flat inner faces of the outer, hollow member for regulating the magnitude of the clearance of the subsequent or final treatment stage.

The body of the casing is preferably hollow to provide for circulating a cooling fluid or for a heating fluid as may be desired for the respective mixtures to be emulsified.

If desired, the inner rotor member may be of a plurality of corresponding elements, respectively adjustably mounted on a common shaft or on separate shafts and common clearance regulating means provided for adjustably setting such corresponding elements to thereby regulate the effective shearing forces at the respective subsequent or final emulsifying stages.

Pursuant to my method and in carrying out the operation of my machine, the mixture to be emulsified is fed to the emulsifying stage by centrifugal force applied to the mixture and the time period of emulsification controlled by regulating the counter-centrifugal force applied to the emulsified mixture. Such step of the regulation of the time period of the treatment is effected by the determination of the effective length of the flange of the outer member, which is preferably also rotated and in a direction opposite to that of the inner rotor member. Such determination of the flange length regulates the location of the discharge of the emulsified mixture from the final emulsifying stage, whereafter the emulsified mixture is delivered into the casing. The discharge of the emulsified mixture from the casing is expedited by the centrifugal force applied thereby by the outer rotor member.

Pursuant to my method, a set of outer rotor members of different effective flange lengths may be employed for a single inner rotor member for assembly in the same casing, for deriving variable time periods of treatment for the various characters of mixtures to be homogenized.

My invention is applicable for obtaining all forms of emulsions and colloids in the various arts such as ice-cream and the like, milk of magnesia, cod liver oil emulsions and other pharmaceutical preparations, oil-asphalt suspensions, paints and so forth.

Further features and objects of the invention will be more fully understood from the following detail description and the accompanying drawings, in which Fig. 1 is a vertical, central, sectional elevation of a preferred form of my colloidal mill;

Fig. 2 is a sectional elevation, on a slightly reduced scale, on line 2—2 of Fig. 1;

Fig. 3 is a side elevation of Fig. 2;

Fig. 4 is a vertical, central, sectional elevation showing a modification;

Fig. 5 is an end view at the right-hand end of Fig. 4; and

Fig. 6 is a sectional elevation on line 6—6 of Fig. 4.

Referring to the drawings, the casing is of substantially cylindrical form of the required dimensions. In the particular embodiments of colloid mill illustrated in the drawings, the casing comprises the frame plates 10, 11 disposed on and secured to the opposite sides of the central frame member 12. The lowerly arm 13 supporting the right-hand bearing is secured to or otherwise integral with a lowerly portion of the right-hand frame plate 10 and symmetrically disposed bearing supporting arms 14 (one only being illustrated in Fig. 1) are secured to or cast integral with the upper portions of the right-hand frame plate 10. The three bearing supporting arms 15, 16, 17, see also Fig. 3, are respectively secured to the central and upper portions of the left-hand frame plate 11, and are usually cast integrally therewith.

The right-hand frame plate 10 is cast with the central, circularly extending bearing supporting flange 18, which is machine-threaded on its inner face as indicated at $18^a$, to adjustably receive the ball bearing cage or equivalent housing for the end of the right-hand hollow shaft end 19, as described more fully hereinafter; such cage or bearing housing co-operates with suitable means for adjusting the clearance between the two rotor members at a treatment stage, as also is more fully described hereinafter.

The left-hand frame plate 11 is similarly provided with the central, circularly extending flange 20, which is similarly screw-threaded on its inner face, as indicated at $20^a$, for adjustably receiving a ball bearing cage or housing for the left-hand shaft end 21 and for regulating the magnitude of the clearance between the two rotor members, as also is more fully described hereinafter.

The three arms 13, 14, 14 unite at their outer ends in the circularly extending boss 22 for receiving the bearing 23, in which the right-hand end 24 of the shaft 25 for one of the rotor members is journalled. The arms 15, 16 and 17 similarly join at their outer ends in the circularly extending boss 26 for receiving the bearing 27, for the left-hand end 28 of the shaft 25.

The intermediate or central casing member 12 is preferably hollow to provide the inner passage 29 for the circulation of a cooling fluid or for a heating fluid, and appropriate inlet and outlet openings, 30, 31, see Fig. 2, are provided for the entry and discharge of such temperature regulating fluid.

The casing as a whole is mounted on any suitable base, but is preferably arranged to be adjustable to thereby afford a simple method of securing proper frictional engagement with the driving belts, upon the stretch or other change of length of the belts, namely, by displacing the casing and therewith the driven pulleys for the respective shafts 25, 19, relative to drive driving motor or line of shafting or the like. A preferred form of such adjustable base mounting is indicated in Figs. 2 and 3, and comprises the base plate 32 having the oppositely disposed, depending peripheral flanges 33 which serve in lieu of feet and which may have suitable openings for receiving bolts for securing the base 32 to a floor, platform or other suitable support. The upper face of the base plate 32 is machined to provide the grooved depression 35, see Fig. 1, into which is snugly received the bottom portion 36 of the central casing member 12. The oppositely disposed lateral flanges 37 of the bottom portion 36 are provided with openings for receiving the securing bolts 38, see Fig. 3. Upon unloosening the bolts 38, the bottom portion 36 of the intermediate casing member 12 is slidable relative to the upper face 35 of the base member 32, and may be adjustably displaced in its position by any suitable mechanical means, such as the lag screw 39 mounted in the threaded lug 40, cast with the base 32. The end 41 of the lag screw 39 abuts one side of the bottom portion 29 of the casing. The threaded lug 40 is positioned on the side of the casing toward the motor or the line of shafting.

The circular end plates 10, 11 are positioned on the opposite sides of the central casing member 12 by suitable positioning screws 12$^a$, which are tapped in suitably threaded openings in the central casing member 12. The opening in the central flange member of the right-hand casing plate 10 about the shaft 25 and the right-hand hollow shaft end 19 is closed by the annular plate 42, rabbeted at its peripheral edge as indicated at 43 and carrying the packing ring 44, adjustably held in position by the annular clamping ring 45 secured by its screws 46.

In like manner, the central opening of the left-hand circular flange 20 of the left-hand end plate 11 is closed by the annular plate 47 rabbeted at its outer periphery as indicated at 48 and provided with a fluid seal in the form of a packing ring 49, held adjustably in position by the annular clamping ring 50 secured by its screws 51.

The rotor members of the homogenizer are shown in Fig. 1 respectively as a hollow outer member formed of the mutually telescoping rotor elements 52, 53, the rotor element 52 being shown at the right and the rotor element 53 at the left. The telescoping mutually engaging surfaces 54, 55, of the respective members 52, 53 are ground with corresponding taper to make a close machine fit to seal against fluid leakage; suitable means are provided for guiding the surfaces 54, 55 relative to one another upon the displacement of the body portions of the rotor elements toward and away from one another as the case may be by the clearance regulating means described more fully hereinafter. One such form of such guiding means is illustrated in the drawings and comprises a set of guide pins 56 tapped in suitable openings in the inwardly disposed flange face 54 of the rotor member 52, the heads of which pins 56 project within the open-ended slots 57 in the outwardly disposed flange face 55 of the rotor member 53.

The inner rotor member may be of any suitable form providing for a plurality of surfaces, one of which serves as a surface for effecting a film of the ingredients at the initial emulsifying stage and another surface disposed posteriorly of said one surface and for effecting a film or for extending the initially formed film at the subsequent or final emulsifying stage, said posterior surface being regulated in position to thereby regulate the magnitude of the clearance between the inner rotor member and the outer rotor member. Thus, in the form of my invention as illustrated in Figs. 1, 2 and 3, the inner rotor member comprises the substantially cylindrical body 60, see Fig. 2, having the central opening 61 for receiving its shaft 25, to which it is secured by any suitable means, such as a spline 25$^a$, see Fig. 1, and preferably reinforced in securement to its shaft 25 by the tightening screws 62, extending through suitable openings 63. The openings 63 are preferably located toward the central portion of the rotor body 60 in the angular cut 64 extending concentrically with the center of the axis respectively on the opposite faces of the rotor body 60 and substantially symmetrically with one another, thereby preserving the center of rotation of the mass of the body 60 substantially co-incident with the geometrical center of the mass and in alignment with the cylindrical axis of the rotor body 60. Such and similar precautions are advantageous in view of the high speed of rotation of the rotor body 60 desirable in carrying out my invention and thereby affording a shearing stress of high magnitude between the particles of the ingredients to be homogenized.

The rotor body 60 is further provided with a suitable passage for the flow of the ingredients to be homogenized from the filling receptacle of the machine and radially therefrom by centrifugal action to the emulsifying clearances between the effective surfaces of the rotor member 60 and the surfaces of the outer rotor member 52, 53. In this instance, the filling receptacle is illustrated in the form of a U-tube 65, which is fixed in position to the cap ring 66; the cap ring 66 is secured by the screws 66$^a$ to the boss 26 and is provided with a packing ring 67 to liquid-seal the outer end 28 of the hollow shaft 25. The U-tube 65 communicates with the opening 68 of the inner passage 69 of the hollow shaft 25, and the communication is afforded from the passage 69 to the rotor through the one or more slots 70 extending radially of the hollow shaft 25 and leading to the radially extending passages 71 of the inner rotor member 60. Preferably, for reasons of symmetry set forth hereinabove, the passages 71 of the rotor are formed by casting the rotor body 60 in the form of two body portions, 60ª, 60ᵇ, each of a substantially cylindrical mass and joined to one another by the symmetrically disposed masses 72 and providing a set of clearances serving as the passages 71 for the flow of the mixture to be emulsified; the flow of the mixture is facilitated by the ensuing centrifugal force, thereby substantially overcoming the effect of gravity and providing for the substantially equal distribution of the mixture to and over the respective surfaces forming the initial and subsequent or final stages of emulsification.

The initial film forming surface of the illustrated two-part rotor body 60, in this instance, is disposed at two locations, namely, at the cylindrical periphery 72 of the rotor body 60ª and at the cylindrical periphery 73 of the rotor body 60ᵇ, the length or the combined length of such surfaces is selected in the proper design of the two rotor elements 60ª, 60ᵇ of the inner rotor member 60. The magnitude of the clearance between the film forming surfaces 72, 73 and the inner cylindrical faces of the outer rotor members 52, 53, respectively is determined by the proper selection of the radii of the inner and outer rotor members.

A subsequent, film forming passage, and the final film-forming passage in the form of my invention illustrated in Figs. 1, 2 and 3 is provided by the clearances respectively between the outer, flat circular faces 74, 75 of the rotor bodies 60ª, 60ᵇ and the inner faces of the flange 76 of the outer rotor member 52 and of the flange 77 of the outer rotor member 53. The lengths of the flanges 76, 77 are substantially uniform and selected in accordance with the period of emulsifying desired for the particular mixtures charged into the machine. The flanges 76, 77 extend radially toward the respective central portions of the outer rotor members 52, 53, and in commercial embodiments of my invention, the effective length of the flange 76, 77 is determined by selecting the locations of the openings 78 serving as the discharges from the final emulsifying stages. In practice, the openings 78 are cast or cut in the otherwise imperforate bottoms constituting the flanges 76, 77 of the cup-like shaped outer rotor member 52, 53, thus yielding a spider-like formation of the respective rotor members 52, 53, terminating centrally in the enlarged hub portions 79, 80, respectively, with which the respective hollow shaft ends 19, 20 are respectively cast or otherwise united. Suitable provision is made for liquid seals between the respective hub portions 79, 80 and the shaft 25 of the inner rotor member 60 by the packing rings 81, 82 clamped by the securing rings 83, 84, respectively. The shaft 25 of the inner rotor member 60 is rotated by the pulley 85, splined to its shaft 25 and driven by a suitable belt from a motor or line of shafting or equivalent. The outer end of the shaft 25 and its ball bearing 23 is protected by the ring plate 86, secured by the screws 87 to the boss 22.

The regulation of the magnitude of the clearance between the surfaces of the flange 76 and the flat circular face of the rotor 60ª is attained by mounting the shaft end 19 and its ball bearing 88 within the hollow cage 89 to thereby afford suitable means for displacing the shaft end 19 inwardly or outwardly as desired relative to the hub flange 18 of the casing 10. For such purpose, the cage 89 is threaded on its exterior cylindrical surface to mesh with the threading 18ª of the hub flange 18 and the inwardly extending flange 90 is provided for the cage 89 to locate the position of the inner face of the bearing 88; further, I provide the outer ring 91 to serve to lock the bearing 88 to the shaft end 19. The arms 92, secured to the cage 89 afford means for rotating the same and therewith the bearing 88 relatively to the shaft 25 either inwardly or outwardly, that is to say, in either direction parallel to the axis of the shaft 25. A retaining ring plate 93 may be positioned on the hub flange 18 by the screws 94 and provided with suitable openings 95 for receiving one or more pins 96 for locking the handles 92 and therewith the cage 89 in the desired setting of the magnitude of the clearance of the final emulsifying stage.

A similar construction is provided for regulating the magnitude of the clearance between the flat circular face of the inner rotor member 60ᵇ and the inner face of the flange 77 of outer rotor member 53 and like parts are marked by like reference numbers with suffix "ª".

The rotation of the outer rotor members 52, 53 is effected jointly by means of the pulley 97 fixed to the right-hand shaft end 19 and the consequent rotation of the left-hand rotor member 53 by the frictional engagement between the flanges 54, 55, enhanced by the connecting pins 56 within their respective guide slots 57.

The operation of my machine and the carrying out of my method will be largely understood from the foregoing. It will be observed that upon charging into the receptacle 65 the mixture of the ingredients to be emulsified, the same is fed through the passage 69 of the shaft 25, thence through the passages 70, thence through the radial passages 71 between the inner rotor elements 60ª, 60ᵇ, by centrifugal force engendered upon rotating the inner rotor members 60ª, 60ᵇ, whereupon the mixture flows over a two-way path afforded by the clearances between the respective cylindrical peripheries 72, 73 of the inner rotor members 60ª, 60ᵇ and the inner cylindrical faces of the outer rotor members 52, 53, respectively. Preferably, the pulley 85 of the inner rotor members 60ª, 60ᵇ, is rotated in one direction, namely by means of a straight belt from the motor or other driving source, and the outer rotor members 52, 53 jointly rotated in the opposite direction by connecting its pulley 97 by a crossed belt from the same driving source, thereby attaining double speed of emulsification at a relatively slow motor speed and relatively slow rate of rotation of the shafts and therewith connected parts of my machine. At the initial emulsifying stage, the thickness of the film is controlled by the magnitude of its clearance, as above stated. The period of subjection of the mixture at the initial emulsifying stage is controlled by the rate of flow therefrom to the subsequent or final emulsifying stage between the outer flat faces of the rotor members 60ª, 60ᵇ, and the respective flanges 76, 77, as aforesaid and the latter is determined by the magnitude of the clearances as set by the regulating arms 92, 92ª. A scale or dial may be provided on the faces of the retaining plates 93 to give a reading of the magnitude of the clearance and also to facilitate equal setting for both final emulsifying stages. The final emulsion wholly homogenized passes from the respective final emulsifying stages through the openings 78 exteriorly of the outer rotor members 52, 53, thence into the casing of the machine, and finally through the discharge 54ª of the casing.

The degree of shearing force exerted upon the particles of the ingredients of the mixture is determined by the difference in rate of rotation of the inner and outer rotor members, thus affording the control of the degree of homogenizing in the production of the desired emulsion independently of the period of the emulsifying treatment effected in my machine.

In Figs. 4, 5 and 6, I have illustrated another form of my invention embodying two rotor members providing for an initial emulsifying stage and a subsequent emulsifying stage of adjustable clearance. In this form of my invention, the rotor members are preferably rotated in opposite directions, thereby attaining relatively increased speeds of movement of the emulsifying surfaces at relatively low driving speeds of rotation of the respective rotor members, as above explained. In the embodiment shown in Figs. 4, 5 and 6, the inner rotor member comprises two rotor elements mounted on and driven by a common shaft and respectively adjustable relative to such driving shaft; the inner rotor elements are disposed within an outer rotor member of hollow formation.

Specifically, the machine illustrated in Figs. 4, 5 and 6 embodies a casing substantially of the same form and construction as is illustrated in Figs. 1 to 3, excepting that one side plate only, to wit, the side plate 10 shown at the right in Fig. 4, is provided with the set of arms 13, 14 for supporting the right-hand bearing of the shaft 100. Like reference numbers are applied in Figs. 4, 5 and 6 corresponding to like parts of Figs. 1, 2 and 3.

The shaft 100, in this instance, is hollow throughout its length, that is to say, comprises in addition to the hollow passage 69 of the left-hand side of the shaft, leading to the discharge openings 70, the right-hand hollow passage 101 for receiving the rod 102, forming, as hereinafter set forth, an element of the common adjusting means for the setting of inner rotor elements 103, 104. The interior 101 of the hollow shaft 100 is preferably cast with the enlargement 105 serving as a bearing for the rod 102. As one form of mounting the set of rotor elements 103, 104 on the shaft 100, I have illustrated each rotor element 103, 104, provided with a hub 106, secured thereto by the screws 107. Each hub 106, see Figs. 4 and 6, is recessed at 108 to receive the block 109 passing through the oppositely disposed recesses 110 of the hollow shaft 100; the sides of each block 109 snugly fits the faces of its recess 110, whereby the blocks 109 respectively serve to rigidly connect the inner rotor elements 103, 104 with their common shaft 100. The shaft 100 is driven by its pulley 111 by a belt leading from a motor, shafting or the like.

The blocks 109 serve also as elements of the adjustable means for the inner rotor elements 103, 104, in determination of the clearance magnitude, for which purpose each block 109 is perforated with an opening 112, see Fig. 6, which is threaded to respectively receive the opposite threadings 113, 114 of the adjusting rod 102, thus providing for the movement of the respective blocks 109 in opposite directions in their respective slots 110 in the hollow shaft 100 and thereby setting the rotor elements 103, 104 respectively in opposite directions of displacement axially of their common shaft 100. Suitable means are provided for turning the adjusting arm 102, as in the form of the knurled head 115, see Figs. 4 and 5, to which a suitable wrench may be applied. The rod 102 has its outer bearing through the opening 116 in the plate 117; the plate 117 serves also as a retaining plate for the knurled head 115 of the rod 102, for which last-named purpose the plate 117 is provided with the series of openings 118 for receiving the setting pin 119, which is slidably carried in a suitable opening 120 in the knurled head 115. The plate 117, as indicated in Figs. 4 and 5, is secured by screws or equivalent to the hollow shaft 100. The rod 102 is provided with the washer 121 bearing on one face of the retaining plate 117 and the knurled head 120 is provided with the enlargement 122 bearing on the opposite face of the retaining plate 117.

The outer rotor member 123 is hollow and is formed of the cup-shaped portion 123ª, appearing at the right in Fig. 4, and the cap-shaped portion 123ᵇ, appearing at the left in Fig. 4; their engaging edges are secured to one another by the screws 124. The central portions of the parts 123ª, 123ᵇ of the outer rotor member 123 are of general spider formation, providing for the openings 125 set at determined distance for the discharge of the emulsified mixture from the region of emulsifying and thereby determining the time period of the emulsifying treatment. The emulsified mixture is then led into the interior of the casing of the machine, from which is discharged through the outlet 54, similarly as in the machine illustrated in Figs. 1 to 3, inclusive.

The guard rings 126 secured by screws 127 to the respective hubs 128 of the outer rotor member 123 serve to preclude the flow of the emulsified mixture to the bearings 129 for the oppositely extending shaft ends 130, 131 of the outer rotor member 123. The shaft end 130, appearing at the right in Fig. 4, is elongated to receive the pulley 132, splined thereto as indicated at 132ª. The pulley 132 is driven by a belt of a motor, or by a line of shafting or the like.

In the use of the machine illustrated in Figs. 4, 5 and 6, the mixture to be emulsified is charged into the receiving U-tube 65, from which it flows through the passage 69 of the shaft 100, thence through openings 70 of the shaft 100, through the spacing between the inner rotor elements 123ª, 123ᵇ, by the resulting centrifugal force arising by the rotation of the inner rotor elements 123ª, 123ᵇ, and thence by the dual path to the oppositely disposed clearances 134, 134 between the peripheral surfaces of the inner rotor elements 103, 104 respectively and the inner surface of the outer cup-shaped rotor member 123ª. These clearances constitute the initial stages of emulsification and are fixed in extent of magnitude as is determined in the design of the inner and outer rotor members in accordance with the character of emulsifying action to be carried out and the nature of the ingredients of the mixture to be emulsified.

Such initial emulsifying clearances communicate respectively with the emulsifying clearances, one disposed between the right-hand flat face of the inner rotor element 103 and the inner flat face of the cup-shaped member 123ª of the outer rotor member 123 and the other clearance disposed between the left-hand flat face of the left-hand inner rotor element 104 and the inner face of the cap-shaped member 123ᵇ of the outer rotor member 123, which two last-named clearances constitute the final emulsifying clearances and are adjustable in magnitude by means of the co-ordinated parts described hereinabove comprising the common adjustable bar 102 and the connecting blocks 109.

In the form of my invention shown in Figs. 4, 5 and 6, the right-hand bearing 129, as appears in Fig. 4, is enclosed in an outer ring plate 135 and the left-hand bearing 129 is disposed within the hub extension 136 of the left-hand side plate 11 of the casing, which also serves to enclose the bearing 27 for the left-hand end of the hollow shaft 100. The cap-ring 137 is secured to the outer face of the hub extension 136 and carries the U-tube 65, fixed thereto by the bolts 138. The packing ring 139 is interposed between the U-tube 65 and the cap-ring 137 to prevent leakage of the mixture to be emulsified and to seal the lubricant of the left-hand bearing 129 and of the bearing 27.

The parts of my various types of machines are formed of appropriate material; I prefer bronze, Monel metal or steel as the material of the parts which are brought into contact with the liquids to be emulsified, by reason of the non-corrosive properties of such metals for the various mixtures required in the various arts to be homogenized. It will be noted that the assembly and likewise the disassembly of the parts of my machine is of a simple character thereby facilitating the cleansing of the parts upon the completion of any emulsifying operation.

To bestow to any single machine the desired ranges of magnitude of the variable emulsion clearances, a set of the required different sizes of outer rotor members is provided, thus affording the substitution of the outer rotor member having the desired dimensions for attaining the character of emulsification and the desired time period of emulsifying treatment.

By the provision of the two-part inner rotor member I attain the increased surfaces for the respective stages of emulsification in a single colloid mill, without materially increasing the over-all dimensions of the same and thereby substantially increasing the output per each colloid mill, without sacrificing the effectiveness of deriving a wholly homogenized emulsion by a single treatment through the mill. These results are in marked contrast to colloid mills of prior construction in which the speed of passage of the mixture to be emulsified is at a high rate, but which are unsuccessful for the reason that the resultant mixture is but partially emulsified and the material is required to be re-charged into the machine for further emulsification. Such prior art machines are also defective commercially for the reason that there is no control of the time period of the emulsifying treatment therein.

In further distinction from the prior art machines and the prior art methods of emulsification, it will be noted that the present invention provides for the feeding by centrifugal force applied to the mixture to be emulsified and the period of treatment, including the total area of surfaces on which the film of the mixture is formed and at which the emulsification action takes place, is controlled by a regulatable counter-centrifugal force applied to the finally emulsified mixture. The magnitude of the counter-centrifugal force is regulated by determining the location of the discharge of the emulsified mixture from the final emulsifying stage.

It will further be observed that the rate of discharge of the emulsified mixture through the outlet of the casing is enhanced by the centrifugal force applied to the emulsified mixture by the outer rotor member.

From another view point, the present invention provides for a path of a general U-shape, the centrifugal force of feeding being applied along the portion of the U-shaped path represented by one of the stems of the U and the counter-centrifugal force is applied to the opposite stem of the U-shaped path, the latter-named stem being of less length than the first-named stem, the difference in length determining the difference of the centrifugal force and the counter-centrifugal force respectively applied.

The magnitude of the clearances for the respective initial, subsequent and final emulsifying stages is varied as desired, the range of clearance as measured in inches being usually comprised within the range from eight to fifteen one thousandths of an inch, as will appear to those skilled in the art from the hereinabove described disclosure.

In view of the high speeds of rotation, the rotor members may be formed to have the major part of their body portions of relatively light material such as aluminum, aluminum alloys, electron metal or the like and the portions thereof which are exposed to the mixture to be emulsified may be faced with Monel metal or the like.

Whereas, I have described my invention by reference to specific forms thereof, it will be understood that many changes and modifications may be made without departing from the spirit of the invention.

I claim:

1. In a colloid mill, the combination of an inner rotor member comprising two substantially duplicate rotor elements spaced from one another, each of said rotor elements comprising a set of emulsifying surfaces arranged at an angle to one another, common shaft means for rotating said inner rotor elements, said shaft means including a hollow portion serving as a passage for the flow of the mixture to be emulsified to the space between said rotor elements, a member having sets of inner surfaces arranged at an angle to one another coacting respectively with emulsifying surfaces of said rotor elements to form emulsifying clearances and means for supporting said member.

2. In a colloid mill, the combination of an inner rotor member comprising two substantially duplicate rotor elements spaced from one another, each of said rotor elements comprising a set of emulsifying surfaces arranged at an angle to one another, common shaft means for rotating said inner rotor elements, said shaft means including a hollow portion serving as a passage for the flow of the mixture to be emulsified to the space between said rotor elements, a member having sets of inner surfaces arranged at an angle to one another coacting respectively with emulsifying surfaces of said rotor elements to form emulsifying clearances and means for adjusting said member to thereby adjust the relative positions of certain of said inner surfaces of said member to thereby regulate the magnitude of the emulsifying clearance.

3. In a colloid mill, the combination of an inner rotor-member comprising two substantially duplicate rotor elements spaced from one another, each of said rotor elements comprising a set of emulsifying surfaces arranged at an angle to one another, common shaft means for rotating said inner rotor elements, said shaft means including a hollow portion serving as a passage for the flow of the mixture to be emulsified to the space between said rotor elements, a member having sets of inner surfaces arranged to an angle to one another coacting respectively with said emulsifying surfaces of said rotor elements to form emulsifying clearances, means for supporting said member, said supporting means comprising a hollow shaft surrounding said common shaft means, and means for rotating said hollow shaft.

4. In a colloid mill, the combination of an inner rotor member comprising two substantially duplicate rotor elements spaced from one another, each of said rotor elements comprising a set of emulsifying surfaces arranged at an angle to one another, common shaft means for rotating said inner rotor elements, said shaft means including a hollow portion serving as a passage for the flow of the mixture to be emulsified to the space between said rotor elements, a member having sets of inner surfaces arranged to an angle to one another coacting respectively with emulsifying surfaces of said rotor elements to form emulsifying clearances, means for supporting said member, said supporting means comprising a hollow shaft surrounding said common shaft means, and means for rotating said hollow shaft in a direction opposite to the direction of rotation of said inner rotor element.

5. In a colloid mill, the combination of an inner rotor member having a cylindrical periphery and a flat surface, means for rotating said rotor member, an outer member having a cylindrical surface and a flat surface respectively disposed in spaced relation to and coacting with said cylindrical surface and said flat surface of said inner rotor member to form a plurality of sequentially related emulsifying clearances, means for supporting said outer member, said supporting means including a hollow flange surrounding said rotating means and means for regulating the position of said outer member relative to said rotor member to thereby regulate the magnitude of the emulsifying clearance between said flat surface of said rotor member and said flat surface of said outer member.

6. In a colloid mill, the combination of an inner rotor member having a cylindrical periphery and a flat surface, means for rotating said rotor member, said rotating means comprising a shaft having a hollow portion serving as a passage for the flow of a mixture to be emulsified, an outer member having a cylindrical surface and a flat surface respectively disposed in spaced relation to and coacting with said cylindrical surface and said flat surface of said inner rotor member to form a plurality of sequentially related emulsifying clearances, means for supporting said outer member, said supporting means comprising a hollow flange surrounding said shaft and means for adjusting the relative positions of said rotor member and said outer member to thereby adjust the magnitude of the emulsifying clearance between said flat surface of said rotor member and said flat surface of said outer member.

7. In a colloid mill, the combination of an inner rotor member having a cylindrical periphery and a flat surface, means for rotating said rotor member, an outer member having a cylindrical surface and a flat surface respectively disposed in spaced relation to and coacting with said cylindrical surface and said flat surface of said inner rotor member to form a plurality of sequentially related emulsifying clearances, means for supporting said outer member, said supporting means comprising a hollow shaft surrounding said rotating means and means for rotating said hollow shaft.

8. In a colloid mill, the combination of an inner rotor member having a cylindrical periphery and a flat surface, means for rotating said rotor member, an outer member having a cylindrical surface and a flat surface respectively disposed in spaced relation to and coacting with said cylindrical surface and said flat surface of said inner rotor member to form a plurality of sequentially related emulsifying clearances, means for supporting said outer member, said supporting means comprising a hollow shaft surrounding said rotating means and means for rotating said hollow shaft in a direction opposite to that of said inner rotor member.

9. In a colloid mill, the combination of an inner rotor member having a plurality of surfaces arranged at an angle to one another, a shaft for rotating the same, an outer rotor member having a plurality of surfaces arranged at an angle to one another, and shaft means for rotating said outer rotor means, said shaft means comprising hollow shaft elements respectively surrounding said shaft of said inner rotor member.

10. In a colloid mill, the combination of an inner rotor member having a plurality of surfaces arranged at an angle to one another, a shaft for rotating the same, an outer rotor member having a plurality of surfaces arranged at an angle to one another, said shaft comprising a hollow portion serving as a passage for the flow of the mixture to be emulsified and shaft means for rotating said outer rotor means, said shaft means comprising hollow shaft elements respectively surrounding with said shaft of said inner rotor member.

11. In a colloid mill, the combination of an inner rotor member having a plurality of surfaces arranged at an angle to one another, said inner rotor member comprising a plurality of rotor elements spaced from one another, a common shaft for rotating the same, an outer rotor member having a plurality of surfaces arranged at an angle to one another, said shaft comprising a hollow portion serving as a passage for the flow of the mixture to be emulsified and shaft means for rotating said outer rotor means, said shaft means comprising hollow shaft elements respectively surrounding said shaft of said inner rotor member.

12. The combination of an inner rotor member, shaft means for rotating the same, an outer rotor member comprising relatively adjustable rotor elements respectively having surfaces spaced from and coacting with surfaces of said inner rotor member to form a plurality of emulsifying clearances and means for regulating the positions of said adjustable rotor elements to thereby adjust the magnitude of the emulsifying clearances.

13. The combination of an inner rotor member, said inner rotor member comprising a pair of rotor elements spaced from one another, shaft means for rotating the same, an outer rotor member comprising relatively adjustable rotor elements respectively having surfaces spaced from and coacting with surfaces of said inner rotor elements respectively to form a plurality of emulsifying clearances and means for regulating the positions of said adjustable rotor elements to thereby adjust the magnitude of the emulsifying clearances.

14. The combination of an inner rotor member, said inner rotor member comprising a pair of rotor elements spaced from one another, shaft means for rotating the same, said shaft means including a hollow portion serving as a passage for the flow of the mixture to be emulsified therethrough to the space between said rotor elements, an outer rotor member comprising relatively adjustable rotor elements respectively having surfaces spaced from and coacting with surfaces of said inner rotor elements respectively to form a plurality of emulsifying clearances and means for regulating the positions of said adjustable rotor elements to thereby adjust the magnitude of the emulsifying clearances.

15. In a colloid mill, the combination of an inner rotor member comprising two substantially duplicate rotor elements spaced from one another to provide a radial passage therebetween, each rotor element having two surfaces arranged at an angle to one another, common shaft means for rotating said inner rotor elements, an outer rotor member having inner surfaces arranged at an angle to one another corresponding to said aforesaid angle and coacting with said surfaces of said inner rotor elements to form emulsifying clearances, means for supporting said outer rotor member, said supporting means comprising hollow shaft means surrounding said common shaft means, means for rotating said hollow shaft means, and means for adjusting the relative positions of said rotor elements and said outer rotor member to thereby adjust the magnitude of certain of said emulsifying clearances.

16. In a colloid mill, the combination of an inner rotor member comprising two substantially duplicate rotor elements spaced from one another to provide a radial passage therebetween, each rotor element having two surfaces arranged at an angle to one another, common shaft means for rotating said inner rotor elements, said shaft means including a hollow portion serving as a passage for the flow of the mixture to be emulsified to said radial passage between said rotor elements, an outer rotor member having inner surfaces arranged at an angle to one another corresponding to said aforesaid angle and coacting with said surfaces of said rotor elements to form emulsifying clearances, means for supporting said outer rotor member, said supporting means comprising hollow shaft means surrounding said common shaft means, means for rotating said hollow shaft means, and means for adjusting the relative positions of said rotor elements and said outer rotor member to thereby adjust the magnitude of certain of said emulsifying clearances.

17. In a colloid mill, the combination of an inner rotor member comprising two substantially duplicate rotor elements spaced from one another to provide a radial passage therebetween, each rotor element having two surfaces arranged at an angle to one another, common shaft means for rotating said inner rotor elements, an outer rotor member having inner surfaces arranged at an angle to one another corresponding to said aforesaid angle and coacting with said surfaces of said rotor elements to form emulsifying clearances, means for supporting said outer rotor member, said supporting means comprising hollow shaft means surrounding said common shaft means, bearing means interposed between said hollow shaft means and said common shaft means, means for rotating said hollow shaft means, and means for adjusting the relative positions of said rotor elements and said outer rotor member to thereby adjust the magnitude of certain of said emulsifying clearances.

18. In a colloid mill, the combination of an inner rotor member comprising two substantially duplicate rotor elements spaced from one another to provide a radial passage therebetween, each rotor element having two surfaces arranged at an angle to one another, common shaft means for rotating said inner rotor elements, an outer rotor member having inner surfaces arranged at an angle to one another corresponding to said aforesaid angle and coacting with said surfaces of said rotor elements to form emulsifying clearances, means for supporting said outer rotor member, said supporting means comprising hollow shaft means surrounding said common shaft means, means for rotating said hollow shaft means, means for adjusting the relative positions of said rotor elements and said outer rotor member to thereby adjust the magnitude of certain of said emulsifying clearances and a casing for enclosing said inner rotor elements and said outer rotor member.

19. In a colloid mill, the combination of an inner rotor member comprising two substantially duplicate rotor elments spaced from one another to provide a radial passage therebetween, each rotor element having two surfaces arranged at an angle to one another, common shaft means for rotating said inner rotor elements, an outer rotor member having inner surfaces arranged at an angle to one another corresponding to said aforesaid angle and coacting with said surfaces of said rotor elements to form emulsifying clearances, means for supporting said outer rotor member, said supporting means comprising hollow shaft means surrounding said common shaft means, means for rotating said hollow shaft means, means for adjusting the relative positions of said rotor elements and said outer rotor member to thereby adjust the magnitude of certain of said emulsifying clearances and a casing for enclosing said inner rotor elements and said outer rotor member and supporting said hollow shaft means.

20. In a colloid mill, the combination of an inner rotor member comprising two substantially duplicate rotor elements spaced from one another to provide a radial passage therebetween, each rotor element having two surfaces arranged to an angle to one another, common shaft means for rotating said inner rotor elements, an outer rotor member having inner surfaces arranged at an angle to one another corresponding to said aforesaid angle and coacting with said surfaces of said rotor elements to form emulsifying clearances, means for supporting said outer rotor member, said supporting means comprising hollow shaft means surrounding said common shaft means, bearing means interposed between said hollow shaft means and said common shaft means, means for rotating said hollow shaft means, means for adjusting the relative positions of said rotor elements and said outer rotor member to thereby adjust the magnitude of certain of said emulsifying clearances and a casing enclosing said inner rotor elements and said outer rotor member and carrying said bearing means.

21. In a colloid mill, a casing; a rotor member disposed in said casing and having a substantially flat face serving as an emulsifying surface; a shaft for rotating said rotor member; a second rotor member disposed in said casing and having a substantially flat face arranged to be disposed in adjacent relation to the substantially flat face of said first-named rotor member to serve as emulsifying surfaces; means for leading the liquid to be emulsified within the interior of said casing to the outer peripheries of said rotor members; shaft means for rotating said second-named rotor member in a direction opposite to that of said first-named rotor member; and adjustable means for regulating the effective spacing between said substantially flat faces to thereby regulate the degree of emulsification of the liquid by said substantially flat faces.

22. In a colloid mill, a casing; a rotor member disposed in said casing and having a substantially annular flat face serving as an emulsifying surface; a shaft for rotating said rotor member; a second rotor member disposed in said casing and having a substantially annular flat face arranged to be disposed in adjacent relation to the substantially flat face of said first-named rotor member to serve as emulsifying surfaces; means for leading the liquid to be emulsified within the interior of said casing to the outer peripheries of said rotor members; shaft means for rotating said second-named rotor member in a direction opposite to that of said first-named rotor member; and adjustable means for regulating the effective spacing between said substantially flat faces to thereby regulate the degree of emulsification of the liquid by said substantially flat faces.

23. In a colloid mill, a casing; a rotor member disposed in said casing and having a substantially flat face serving as an emulsifying surface; a shaft for rotating said rotor member; a second rotor member disposed in said casing and having a substantially flat face arranged to be disposed in adjacent relation to the substantially flat face of said first-named rotor member to serve as emulsifying surfaces; means for leading the liquid to be emulsified within the interior of said casing to the outer peripheries of said rotor members, shaft means for rotating said second-named rotor member in a direction opposite to that of said first-named rotor member; and adjustable means co-operating with said shaft means for regulating the effective spacing between said substantially flat faces to thereby regulate the degree of emulsification of the liquid by said substantially flat faces.

24. In a colloid mill, a casing; a rotor member disposed in said casing and having a substantially annular flat face serving as an emulsifying surface; a shaft for rotating said rotor member; a second rotor member disposed in said casing and having a substantially annular flat face arranged to be disposed in adjacent relation to the substantially flat face of said first-named rotor member to serve as emulsifying surfaces; means for leading the liquid to be emulsified within the interior of said casing to the outer peripheries of said rotor members; shaft means for rotating said second-named rotor member in a direction opposite to that of said first-named rotor member; and adjustable means co-operating with said shaft means for regulating the effective spacing between said substantially flat faces to thereby regulate the degree of emulsification of the liquid by said substantially flat faces.

25. In a colloid mill, a casing; a rotor member disposed in said casing and having a substantially flat face serving as an emulsifying surface; a shaft for rotating said rotor member; a second rotor member disposed in said casing and having a substantially flat face arranged to be disposed in adjacent relation to the substantially flat face of said first-named rotor member to serve as emulsifying surfaces; means for leading the liquid to be emulsified within the interior of said casing to the outer peripheries of said rotor members; shaft means for rotating said second-named rotor member in a direction opposite to that of said first-named rotor member; means for withdrawing the emulsified liquid from a substantially central portion of said casing; and adjustable means co-operating with said shaft means for regulating the effective spacing between said substantially flat faces to thereby regulate the degree of emulsification of the liquid by said substantially flat faces.

26. In a colloid mill, a casing; a rotor member disposed in said casing and having a substantially annular flat face serving as an emulsifying surface; a shaft for rotating said rotor member; a second rotor member disposed in said casing and having a substantially annular flat face arranged to be disposed in adjacent relation to the substantially flat face of said first-named rotor member to serve as emulsifying surfaces; means for leading the liquid to be emulsified within the interior of said casing to the outer peripheries of said rotor members; shaft means for rotating said second-named rotor member in a direction opposite to that of said first-named rotor member; means for withdrawing the emulsified liquid from a substantially central portion of said casing; and adjustable means co-operating with said shaft means for regulating the effective spacing between said substantially flat faces to thereby regulate the degree of emulsification of the liquid by said substantially flat faces.

In testimony whereof I have signed this specification this 12th day of December, 1925.

LOUIS A. MOLIN.